United States Patent Office.

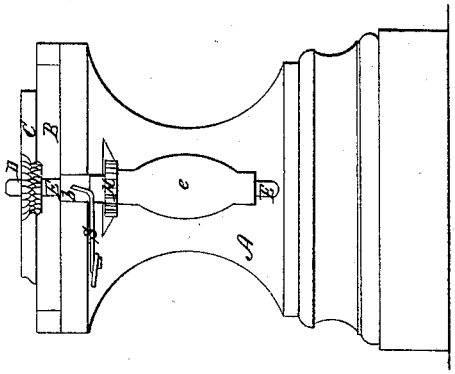

JAMES W. MALOY, OF BOSTON, MASSACHUSETTS, ASSIGNOR TO THE AMERICAN MARBLE-CUTTING COMPANY, OF SAME PLACE.

*Letters Patent No. 61,220, dated January 15, 1867.*

IMPROVED STONE-CUTTING MACHINE.

*The Schedule referred to in these Letters Patent and making part of the same.*

Be it known that I, JAMES W. MALOY, of Boston, in the county of Suffolk, and State of Massachusetts, have invented a new and useful improvement in Machines for Cutting and Dressing Stone, Marble, &c., of which the following is a full, clear, and exact description, reference being had to the accompanying drawings, making a part of this specification, in which—

Figure 1 represents a top view of my machine.

Figure 2 is a vertical section.

Figure 3 is a cross-section on the line of fig. 2; and

Figure 4 is an elevation.

Similar letters indicate like parts in the several figures.

My invention relates to an improvement upon a machine for which Letters Patent have been already granted to me, and it consists in constructing and arranging the shaft that carries the revolving cutter in such a manner as to impart to the cutter a reciprocating motion in connection with its rotary motion, to operate upon the stone as it is being cut or dressed.

Referring to the drawings, A represents a support or frame, which may be of any suitable form or material. On its top is a sliding table or platform, B, upon which is placed the stone or marble C to be dressed or cut. At one side of the support or stand A is a shaft, which rests somewhat loosely in a cavity in the stand, or it may be stepped in the same in any suitable manner. On the upper end of the shaft D is secured a revolving cutter, D, provided with a series of teeth or cutters, as used in the machine for which a patent has been already granted to me, bearing date April 11, 1866. At a short distance below the surface of the stand A, upon the shaft D, is secured a toothed-wheel, H, the teeth of which may or may not correspond in number and position with the teeth on the cutter H. The teeth on the wheel H are so formed that as they come in contact with a stud or projection, $p$, in the stand A, the wheel and shaft will be forced outwards, and on passing the tooth $p$ the wheel will be pressed forward so as to cause the tooth of the cutter D to strike forcibly and suddenly against the stone being operated upon. The forward pressure of the shaft is effected by means of a spring, S, so arranged as to press upon a bearing, $l$, in which the shaft E is journaled, the said bearing fitting within a recess in the upper part of the stand A, so as to admit of a free motion forward and back in the same. The shaft is surrounded by an enlarged portion, $e$, on which an endless band may be arranged for imparting motion to the shaft and cutter. It will thus be seen that as the cutter D revolves, it will also have a reciprocating motion imparted to it, which will cause it to strike continuously upon the stone.

Having thus described my invention, what I claim as new, and desire to secure by Letters Patent, is—

1. The combination, with the revolving cutting tool D, of the toothed wheel H and projection $p$, or their equivalents, for imparting a reciprocating motion to the said cutting tool, as set forth.

2. The combination of the vibrating shaft F with the movable bearing $l$ and spring S, as and for the purpose set forth.

In testimony whereof I have signed my name to this specification in the presence of two subscribing witnesses.

JAMES W. MALOY.

Witnesses:
S. F. SUMMERS,
J. H. ADAMS.